US011693106B2

(12) United States Patent
Lang et al.

(10) Patent No.: US 11,693,106 B2
(45) Date of Patent: Jul. 4, 2023

(54) MULTIPLE INPUT MULTIPLE OUTPUT (MIMO) FREQUENCY-MODULATED CONTINUOUS-WAVE (FMCW) RADAR SYSTEM

(71) Applicant: Infineon Technologies AG, Neubiberg (DE)

(72) Inventors: Oliver Lang, Linz (AT); Michael Gerstmair, Langenstein (AT); Alexander Melzer, Neutillmitsch (AT); Christian Schmid, Linz (AT)

(73) Assignee: Infineon Technologies AG, Neubiberg (DE)

( * ) Notice: Subject to any disclaimer, the term of this patent is extended or adjusted under 35 U.S.C. 154(b) by 443 days.

(21) Appl. No.: 16/675,574

(22) Filed: Nov. 6, 2019

(65) Prior Publication Data

US 2020/0150260 A1    May 14, 2020

(30) Foreign Application Priority Data

Nov. 8, 2018 (DE) .......................... 102018127947.7

(51) Int. Cl.
| | | |
|---|---|---|
| *G01S 13/58* | (2006.01) | |
| *G01S 7/41* | (2006.01) | |
| *H04B 7/04* | (2017.01) | |
| *H04B 7/0413* | (2017.01) | |

(52) U.S. Cl.
CPC .......... *G01S 13/584* (2013.01); *G01S 7/415* (2013.01); *H04B 7/0413* (2013.01)

(58) Field of Classification Search
CPC ...... G01S 13/282; G01S 7/292; G01S 13/524; G01S 13/589; G01S 13/64; G01S 13/449; G01S 7/4056; G01S 13/04; G01S 13/06; G01S 13/583; G01S 13/72; G01S 13/726; G01S 13/584; G01S 7/415; G01S 7/356; G01S 7/354; G01S 13/343; G01S 13/931; G01S 13/42; G01S 13/878; G01S 13/48;

(Continued)

(56) References Cited

U.S. PATENT DOCUMENTS 9,024,809 B2 * 5/2015 Testar .................. G01S 13/343
342/128
2015/0287422 A1 * 10/2015 Short ........................ G01S 3/74
704/211

(Continued)

*Primary Examiner* — Erin F Heard
*Assistant Examiner* — Juliana Cross
(74) *Attorney, Agent, or Firm* — Harrity & Harrity, LLP

(57) ABSTRACT

Methods for detecting radar targets are provided. According to one exemplary embodiment, the method includes providing a digital radar signal having a sequence of signal segments. Each signal segment of the sequence is respectively associated with a chirp of a transmitted RF radar signal. The method further includes detecting one or more radar targets based on a first subsequence of successive signal segments of the sequence. For each detected radar target, a distance value and a velocity value are determined. If a group of radar targets having overlapping signal components has been detected, a respective spectral value is calculated for each radar target of the group of radar targets based on a second subsequence of the sequence of signal segments and further based on the velocity values ascertained for the group of radar targets.

21 Claims, 10 Drawing Sheets

(58) Field of Classification Search
CPC .......... G01S 13/60; G01S 13/62; G01S 13/91; G01S 13/92; H04B 7/0413
See application file for complete search history.

(56) References Cited

U.S. PATENT DOCUMENTS

| | | | |
|---|---|---|---|
| 2016/0018511 A1* | 1/2016 | Nayyar | G01S 7/03 342/27 |
| 2018/0136324 A1* | 5/2018 | Klotzbuecher | G01S 7/354 |
| 2021/0124011 A1* | 4/2021 | Madhow | G01S 13/86 |

\* cited by examiner

MULTIPLE INPUT MULTIPLE OUTPUT (MIMO) FREQUENCY-MODULATED CONTINUOUS-WAVE (FMCW) RADAR SYSTEM

RELATED APPLICATION

This application claims priority to German Patent Application No. 102018127947.7, filed on Nov. 8, 2018, which is incorporated herein by reference in its entirety.

FIELD

The present description relates to the field of radar sensors, in particular to signal processing methods used in multiple input multiple output (MIMO) radar systems for detecting objects.

BACKGROUND

Radar sensors are used in a multiplicity of applications for detecting objects (known as the radar targets), wherein the detection usually comprises measuring distances and velocities of the detected objects. In particular in the automotive sector, there is an increasing need for radar sensors that can be used inter alia in driving assistance systems (e.g., Advanced driver assistance systems (ADAS)) such as e.g. in adaptive cruise control (ACC) or radar cruise control systems. Such systems can automatically adapt the velocity of an automobile so as to keep a safe distance from other automobiles traveling ahead (and also from other objects and from pedestrians). Further applications in the automotive sector are e.g. blind spot detection, lane change assist and the like. In the field of autonomous driving, radar sensors will play an important part for the control of autonomous vehicles.

Precise detection of objects in the measuring area of a radar sensor normally requires a radar system having multiple transmission and reception channels. Such radar systems are usually referred to as multiple input multiple output (MIMO) radar systems. In particular if not only the distance and the velocity of an object but also the angle of azimuth thereof is supposed to be ascertained, MIMO systems are needed. Signal processing techniques referred to generally as beamforming techniques can be used for determining the angle of azimuth associated with a radar target.

SUMMARY

The description in this document relates to a method for detecting radar targets. According to one exemplary embodiment, the method includes providing a digital radar signal having a sequence of signal segments. Each signal segment of the sequence is respectively associated with a chirp of a transmitted RF radar signal. The method further includes detecting one or more radar targets based on a first subsequence of successive signal segments of the sequence. For each detected radar target, a distance value and a velocity value are determined. If a group of radar targets having overlapping signal components has been detected, a respective spectral value is calculated for each radar target of the group of radar targets based on a second subsequence of the sequence of signal segments and further based on the velocity values ascertained for the group of radar targets.

According to a further exemplary embodiment, the radar method includes transmitting a first subsequence of temporally successive chirps via a first channel of a radar system and transmitting one or more further subsequences of temporally successive chirps via different channels, wherein the further subsequences come after the first sequence in time and each have a smaller number of chirps than the first subsequence. The method further includes detecting one or more radar targets and ascertaining a distance value and a velocity value for each of the detected radar targets based on just the first subsequence, and calculating an angle for each of the detected radar targets based on the further subsequences.

In addition, a radar system is described. According to one exemplary embodiment, the radar system includes a radar transceiver designed to provide a digital radar signal having a sequence of signal segments, wherein each signal segment of the sequence is respectively associated with a chirp of a transmitted RF radar signal. The system further includes a computing unit designed to detect one or more radar targets based on a first subsequence of successive signal segments of the sequence. In this case, a distance value and a velocity value are determined for each detected radar target. The computing unit is further designed to ascertain whether the detected radar targets include a group of radar targets having overlapping signal components. If a group of radar targets having overlapping signal components has been ascertained, a respective spectral value is calculated for each radar target of the group of radar targets based on a second subsequence of the sequence of signal segments and further based on the velocity values ascertained for the group of radar targets.

According to a further exemplary embodiment, the radar system includes a radar transceiver designed to transmit a first subsequence of temporally successive chirps via a first channel of the radar system and further to transmit one or more further subsequences of temporally successive chirps via different channels, wherein the further subsequences come after the first sequence in time and each have a smaller number of chirps than the first subsequence. The system further includes a computing unit designed to detect one or more radar targets and to ascertain a distance value and a velocity value for each of the detected radar targets based on just the first subsequence, and further designed to ascertain an angle for the detected radar targets based on the further subsequences.

BRIEF DESCRIPTION OF THE DRAWINGS

Exemplary embodiments are explained more specifically below on the basis of figures. The depictions are not necessarily to scale and the exemplary embodiments are not restricted just to the depicted aspects. Rather, importance is attached to depicting the principles on which the exemplary embodiments are based. In the figures.

DETAILED DESCRIPTION

Figure 1:
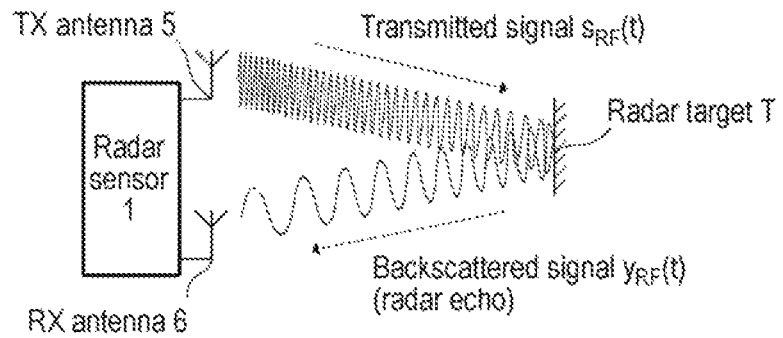
FIG. 1 is an outline to illustrate the operating principle of an FMCW radar system for measuring distance and/or velocity.

FIG. 1 uses a schematic diagram to illustrate the use of a frequency-modulated continuous-wave radar system—usually referred to as FMCW radar system—as a sensor for detecting objects, which are usually referred to as radar targets. The detection usually comprises determining the distance (range) and velocity of the respective radar target. In order to locate the target even more accurately, modern radar systems are designed to determine the angle of azimuth of a target too.

In the present example, the radar apparatus 1 has separate transmission (TX) and reception (RX) antennas 5 and 6 (bistatic or pseudo-monostatic radar configuration). However, it should be noted that a single antenna can also be used, which serves as a transmission antenna and as a reception antenna at the same time (monostatic radar configuration). The transmission antenna 5 emits a continuous RF signal $s_{RF}(t)$, which is frequency-modulated with a sawtooth signal (periodic, linear frequency ramp), for example. The emitted RF radar signal $s_{RF}(t)$ is scattered back from the radar target T and the backscattered/reflected signal $y_{RF}(t)$ (echo signal) is received by the reception antenna 6. FIG. 1 shows a simplified example; in practice, radar sensors are systems having multiple transmission (TX) and reception (RX) channels, in order also to be able to determine the angle of incidence (Direction of Arrival, DoA) of the backscattered/reflected signal $y_{RF}(t)$, i.e. the aforementioned angle of azimuth of the radar target T.

Figure 2:
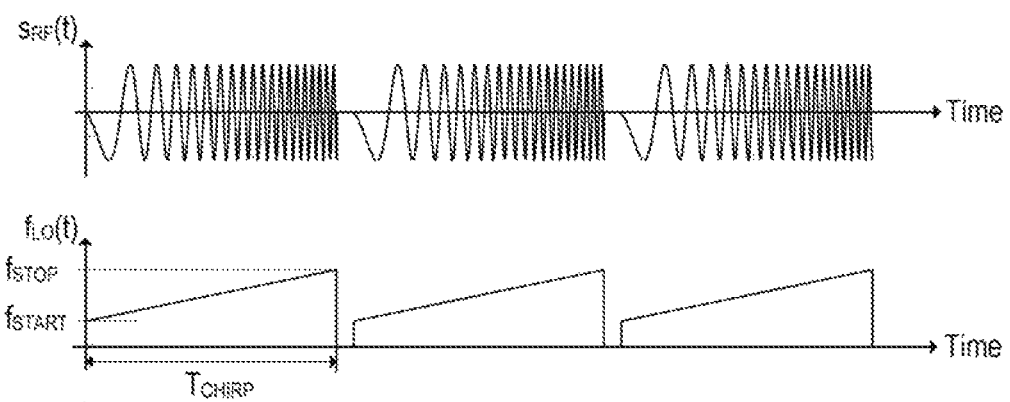
FIG. 2 comprises two timing diagrams to illustrate the frequency modulation (FM) of an RF signal generated by the FMCW system.

FIG. 2 illustrates in exemplary fashion the aforementioned frequency modulation of the signal $s_{RF}(t)$. As depicted in FIG. 2 (upper graph), the emitted RF signal $s_{RF}(t)$ is made up of a set of "chirps", i.e. the signal $s_{RF}(t)$ comprises a sequence of sinusoidal signal characteristics (waveforms) with a rising frequency (up-chirp) or falling frequency (down-chirp). In the present example, the instantaneous frequency $f_{LO}(t)$ of a chirp rises, beginning at a starting frequency $f_{START}$, linearly to a stop frequency $f_{STOP}$ within a time period $T_{CHIRP}$ (see lower graph in FIG. 2). Such chirps are also referred to as linear frequency ramps. FIG. 2 depicts three identical linear frequency ramps. However, it should be noted that the parameters $f_{START}$, $f_{STOP}$, $T_{CHIRP}$ and the pause between the individual frequency ramps (and hence the chirp repetition rate) can vary. The frequency variation also does not necessarily have to be linear (linear chirp). Depending on the implementation, it is also possible for transmission signals having exponential or hyperbolic frequency variation (exponential or hyperbolic chirps) to be used, for example.

Figure 3:
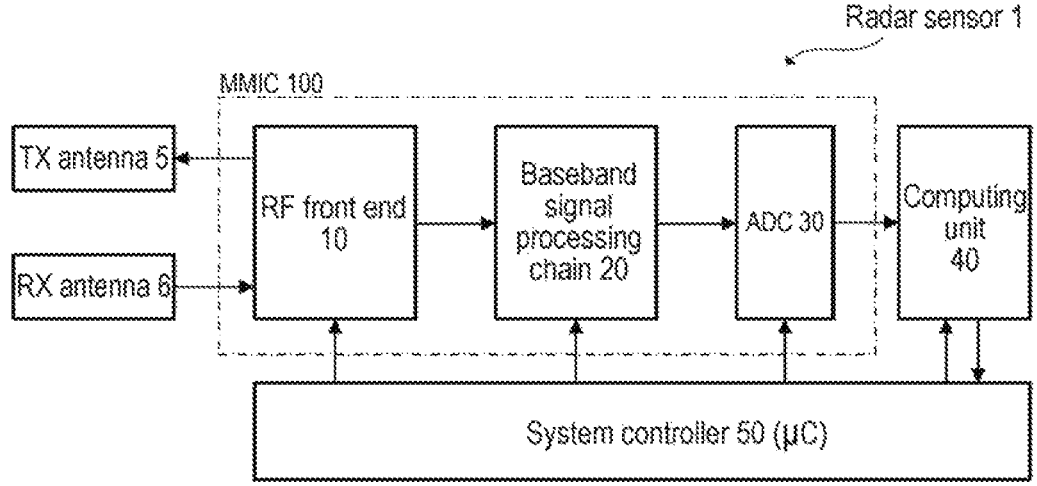
FIG. 3 is a block diagram to illustrate the basic structure of an FMCW radar system.

FIG. 3 is a block diagram, depicting a possible structure of a radar apparatus 1 (radar sensor) in exemplary fashion. Accordingly, one or more transmission antennas 5 (TX antennas) and one or more reception antennas 6 (RX antennas) are connected to an RF front end 10, integrated in a chip, that can include all those circuit components that are needed for the RF signal processing. These circuit components comprise for example a local oscillator (LO), RF power amplifiers, low-noise amplifiers (LNAs), directional couplers (e.g. rat-race couplers, circulators, etc.) and mixers for the down-conversion of the RF signals to baseband or an intermediate frequency band (IF band). The RF front end 10 can be integrated—possibly together with further circuit components—in one or more chips, which are usually referred to as monolithic microwave integrated circuits (MMICs).

The depicted example shows a bistatic (or pseudo-monostatic) radar system having separate RX and TX antennas. In the case of a monostatic radar system, the same antenna would be used both for emitting and for receiving the electromagnetic (radar) signals. In this case, a directional coupler (e.g. a circulator) can be used to separate the RF signals to be emitted from the received RF signals (radar echo signals). As mentioned, radar systems mostly have multiple transmission and reception channels having multiple transmission and reception antennas in practice, which allows among other things measurement of the direction (also referred to as Direction of Arrival, DoA) from which the radar echoes are received. In such MIMO systems, the individual (physical) TX channels and RX channels are usually each of the same or similar design. From multiple TX antennas and RX antennas, it is possible for what are known as virtual antenna arrays to be formed, which can be used for implementing beamforming techniques. By way of example, a system having three TX antennas and four RX channels can be used to implement an antenna array having 12 (three times four) virtual antenna elements.

In the case of an FMCW radar system, the RF signals emitted via the TX antenna(s) 5 can be e.g. in the range from approximately 20 GHz to 100 GHz (e.g. around 77 GHz in some applications). As mentioned, the RF signal received by each RX antenna 6 comprises radar echoes (chirp echo signals), i.e. those signal components that are backscattered from one or more radar targets. In each RX channel, the received RF signal $y_{RF}(t)$ is down-converted to baseband and can be processed further in baseband by means of analog signal processing (see FIG. 3, analog baseband signal processing chain 20). Said analog signal processing can substantially comprise a filtering and possibly an amplification of the baseband signal. The baseband signal is finally digitized (see FIG. 3, analog-to-digital converter 30) and processed further in the digital domain. At least part of the digital signal processing chain can be realized as software (e.g. firmware) that can be executed on one or more processors, for example a microcontroller and/or a digital signal processor (see FIG. 3, computing unit 40).

The overall system is normally controlled by means of a system controller 50, at least some of which can likewise be implemented by means of firmware or software that is executed on a processor such as e.g. a microcontroller. The RF front end 10 and the analog baseband signal processing chain 20 (optionally also the analog-to-digital converter 30 and the computing unit 40) may be integrated together in a single MMIC (i.e. an RF semiconductor chip). Alternatively, the individual components may also be distributed over multiple integrated circuits (MMICs). Distributed radar systems having multiple coupled MMICs are known per se and are not discussed further in this document. To simplify the illustration, and since it is not necessary for the further explanations, a distinction is not drawn below between "Single-Chip" radar systems and distributed radar systems.

Figure 4:
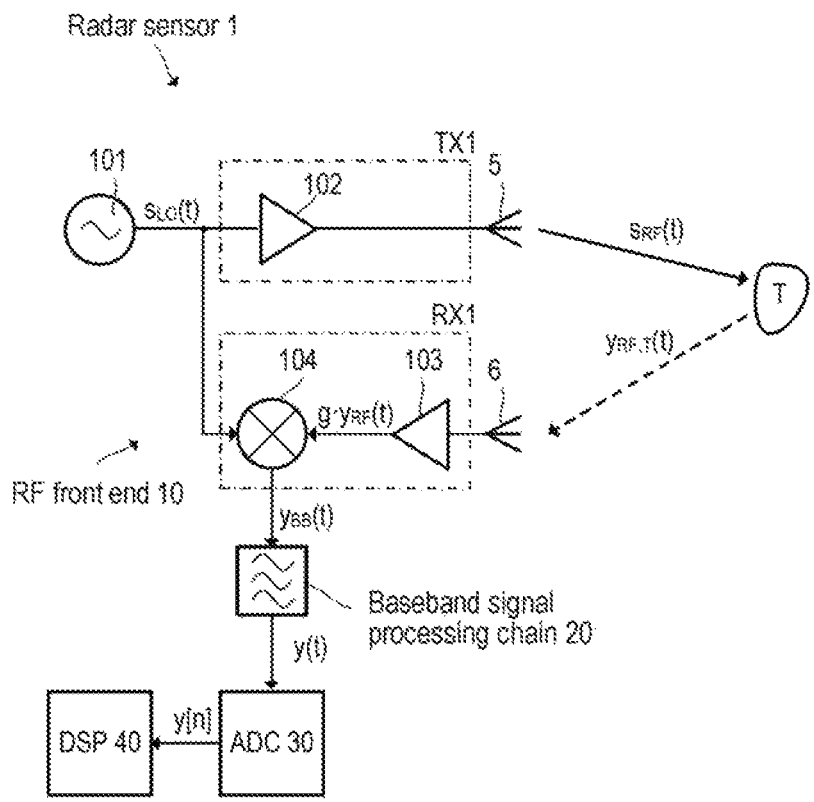
FIG. 4 is a circuit diagram to illustrate a simplified example of a radar transceiver and of a further radar transceiver that causes interference.

FIG. 4 illustrates an exemplary implementation of a radar transceiver 1 according to the example from FIG. 3 in more detail. The present example depicts in particular the RF front end 10 of the radar sensor 1 (cf. FIG. 3). It should be noted that FIG. 4 depicts a simplified circuit diagram in order to show the basic structure of the RF front end 10 having a transmission channel (TX channel) and a reception channel (RX channel). Actual implementations, which can be highly dependent on the specific application, are usually more complex and have multiple TX and/or RX channels. Such systems having multiple TX and RX channels can be operated as MIMO systems.

The RF front end 10 comprises a local oscillator 101 (LO) that generates an RF oscillator signal $s_{LO}(t)$. The RF oscillator signal $s_{LO}(t)$ is frequency-modulated during operation, as described above with reference to FIG. 2, and is also referred to as LO signal. In radar applications, the LO signal is usually in the SHF (Super High Frequency) or EHF (Extremely High Frequency) band, e.g. in the range from 76 GHz to 81 GHz for some automotive applications. The LO signal $s_{LO}(t)$ is processed both in the transmission signal path TX1 (in the TX channel) and in the received signal path RX1 (in the RX channel).

The RF transmission signal $s_{RF}(t)$ (cf. FIG. 2) emitted by the TX antenna 5 is generated by amplifying the LO signal $s_{LO}(t)$, for example by means of the RF power amplifier 102, and is thus merely an amplified and possibly phase-shifted version of the LO signal $s_{LO}(t)$. The output of the amplifier 102 may be coupled to the TX antenna 5 (in the case of a bistatic or pseudo-monostatic radar configuration). The RF received signal $y_{RF}(t)$ received by the RX antenna 6 is supplied to the receiver circuit in the RX channel and thus directly or indirectly to the RF port of the mixer 104. In the present example, the RF received signal $y_{RF}(t)$ (antenna signal) is preamplified by means of the amplifier 103 (gain g). The mixer 104 thus receives the amplified RF received signal $g \cdot y_{RF}(t)$. The amplifier 103 may be e.g. an LNA. The reference port of the mixer 104 is supplied with the LO signal $s_{LO}(t)$, so that the mixer 104 down-converts the (preamplified) RF received signal $y_{RF}(t)$ to baseband.

The down-converted baseband signal (mixer output signal) is denoted by $y_{BB}(t)$ below. This baseband signal $y_{BB}(t)$ is initially processed further in analog fashion, wherein the analog baseband signal processing chain 20 substantially causes a further amplification and a (e.g. bandpass or low-pass) filtering in order to reject undesirable sidebands and image frequencies. The resulting analog output signal of the reception channel RX1, which is supplied to an analog-to-digital converter (see FIG. 3, ADC 30), is denoted by y(t). Methods for digital further processing of the digitized baseband output signal (digital radar signal y[n]) are known per se (for example range-Doppler analysis) and are thus not discussed further in this document.

In the present example, the mixer 104 down-converts the preamplified RF received signal $g \cdot y_{RF}(t)$ (i.e. the amplified antenna signal) to baseband. The mixing can be effected in one stage (that is to say from the RF band directly to baseband) or via one or more intermediate stages (that is to say from the RF band to an intermediate frequency band and on to baseband). In this case, the reception mixer 104 effectively comprises multiple individual mixer stages connected in series. The mixer 104 can be implemented in different ways. In some exemplary embodiments, the mixer 104 used can be an IQ demodulator (in-phase/quadrature phase demodulator), resulting in the (digital) baseband signal y[n] being a complex-value signal. In other exemplary embodiments, normal mixers are used, which deliver a real baseband signal y[n]. The ideas described in this document are applicable to both variants.

Figure 5:
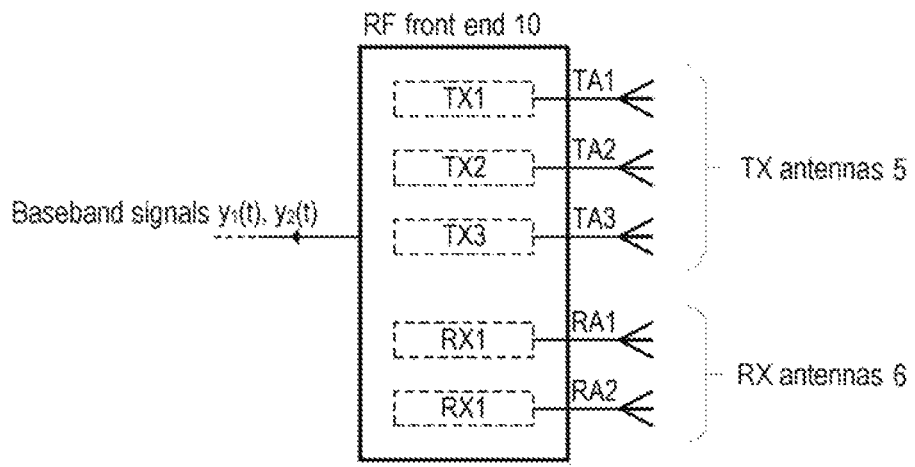
FIG. 5 uses a block diagram to illustrate an example of an RF front end of a MIMO radar system.

FIG. 5 schematically illustrates an RF front end 10 of an MIMO system having three TX antennas 5 and two RX antennas 6. In the example depicted, the RF front end 10 comprises three TX channels TX1, TX2 and TX3 and two RX channels RX1 and RX2. The TX antennas 5 are connected to the outputs TA1, TA2 and TA3 of the TX channels TX1, TX2 and TX3, and the RX antennas 6 are connected to the outputs RA1 and RA2 of the RX channels RX1 and RX2. The RX channels and the TX channels may be of substantially the same design as the RX channel RX1 and the TX channel TX1 in the example from FIG. 4. In the present example, the baseband output signals of the RX channels RX1 and RX2 are denoted by $y_1(t)$ and $y_2(t)$. The baseband output signal y(t) and the associated digital radar signal y[n] (without a subscript) below are representative of those of any RX channel.

Figure 6:
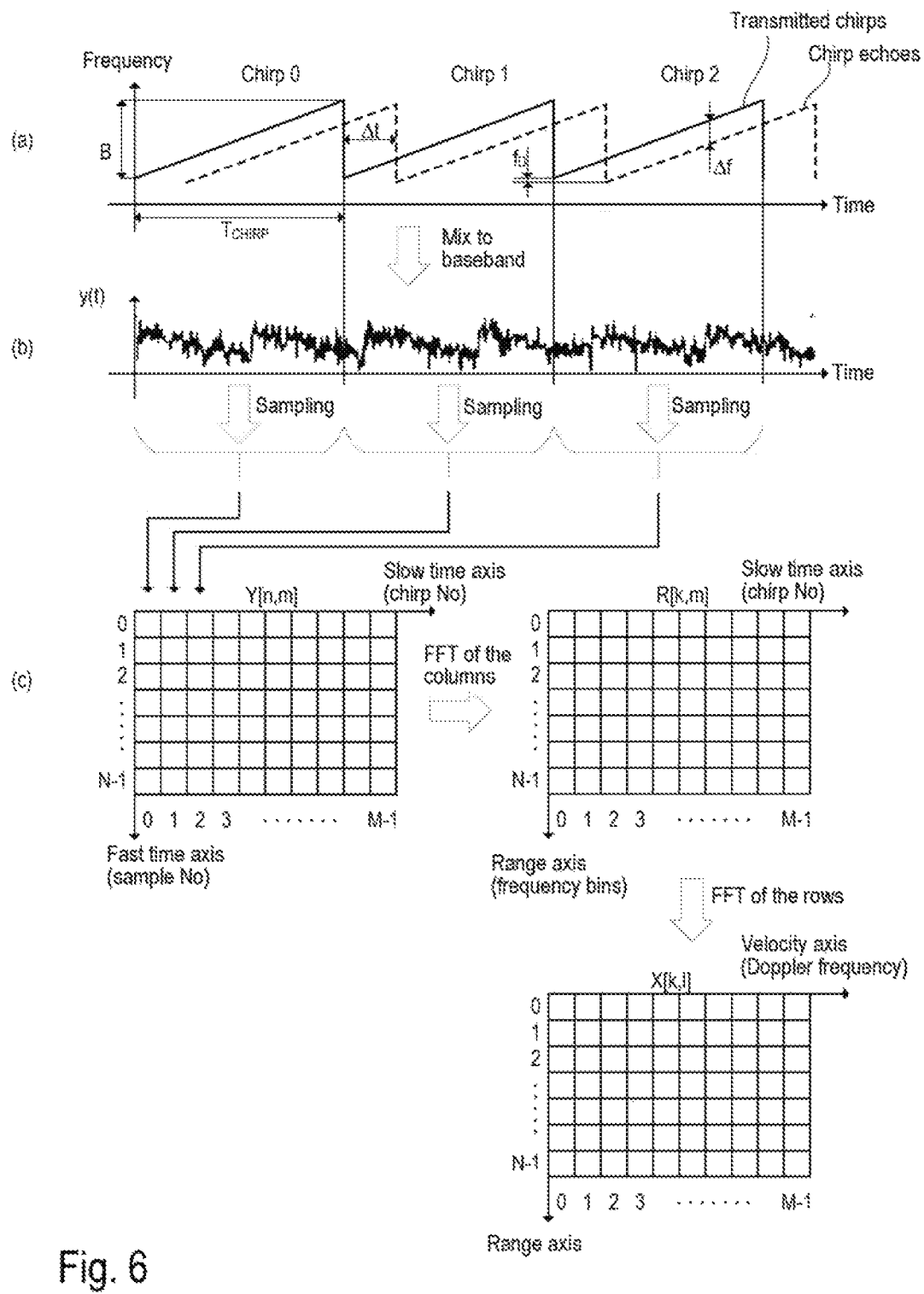
FIG. 6 illustrates in exemplary fashion the digital signal processing of radar signals when detecting radar targets in the range-velocity space (Range-Doppler analysis).

FIG. 6 uses an example to illustrate the signal processing in a radar system through to digitization of the baseband signal y(t), which represents the chirp echo signals, and the subsequent digital processing of the digital radar signal y[n]. Graph (a) from FIG. 6 shows part of a chirp sequence comprising M linear, temporally successive chirps. The solid line represents the signal characteristic (waveform, frequency over time) of the departing RF radar signal $s_{RF}(t)$, and the dashed line represents the corresponding signal characteristic of the arriving RF radar signal $y_{RF}(t)$, which (if present) comprises the chirp echoes. According to graph (a) in FIG. 6, the frequency of the departing radar signal rises linearly, beginning at a starting frequency $f_{START}$, to a stop frequency $f_{STOP}$ (chirp No. 0) and then returns to the starting frequency $f_{START}$, rises again to the stop frequency $f_{STOP}$ (chirp No. 1), and so on.

As mentioned, a chirp sequence comprises a multiplicity of chirps; in the present case, the number of chirps of a sequence is denoted by M. The chirp sequence comprising a number of M chirps can also be referred to as a frame. Typically, each frame sent is followed by an evaluation being performed in order to determine distance, velocity and direction (angle representing the DoA) of the targets, as explained below. Depending on the application, a sequence can also contain chirps having different parameters (starting and stop frequency, duration and modulation pause). During a modulation pause between two successive chirps, the frequency can be e.g. equal to the stop frequency of the previous chirp or the starting frequency of the subsequent chirp (or equal to a different frequency). The chirp duration $T_{CHIRP}$ can be in the range from a few microseconds to a few milliseconds, for example in the range from 20 μs to 2 ms. The actual values can also be larger or smaller depending on the application. The number M of chirps in a sequence can correspond to a power of two, e.g. M=256.

The arriving RF radar signal $y_{RF}(t)$ (i.e. the one received by an RX antenna) lags the departing RF radar signal $s_{RF}(t)$ (i.e. the one emitted by a TX antenna) by a time difference Δt. This time difference Δt corresponds to the signal delay time from the TX antenna to the radar target and back to the RX antenna and is also referred to as the Round Trip Delay Time (RTDT). The distance $d_{Ti}$ of a radar target $T_i$ from the radar sensor is $d_T = c \cdot \Delta t / 2$, i.e. the speed of light c times half the time difference $\Delta t$.

As can be seen in graph (a) in FIG. 6, the time difference $\Delta t$ results in a corresponding frequency difference $\Delta f$. This frequency difference $\Delta f$ can be ascertained by virtue of the arriving (and possibly preamplified) radar signal $y_{RF}(t)$ being mixed with the LO signal $s_{LO}(t)$ of the radar sensor (see FIG. 5, mixer 104), the resulting baseband signal y(t) being digitized and subsequently a digital spectral analysis being performed. The frequency difference $\Delta f$ then appears as a beat frequency in the spectrum of the digitized baseband signal y[n]. If linear chirps are used, the time difference $\Delta t$ can be calculated according to $\Delta t = \Delta f / k$, where the factor k denotes the gradient (hertz per second) of the frequency ramp, which can be calculated according to $k = B / T_{CHIRP}$, B being the bandwidth of a chirp ($B = |f_{STOP} - f_{START}|$). In view of the explanations above, it follows for the sought distance $d_{Ti}$ of the target $T_i$ that:

$$d_{Ti} = c \cdot \Delta t / 2 = c \cdot \Delta f \cdot T_{CHIRP} / (2 \cdot B). \quad (1)$$

Although only the basic operating principle of an FMCW radar sensor has been summarized above, it should be noted that more demanding signal processing is usually applied in practice. By way of example, an additional Doppler shift $f_D$ in the arriving signal on account of the Doppler effect can influence the distance measurement because the Doppler shift $f_D$ is added to the aforementioned frequency difference $\Delta f$. Depending on the application, the Doppler shift can be estimated/calculated from the departing and arriving radar signals and taken into consideration for the measurement, whereas in some applications the Doppler shift can be negligible for the distance measurement. This can be the case e.g. if the chirp duration $T_{CHIRP}$ and the velocity of the target are low, which means that the frequency difference $\Delta f$ is large in comparison with the Doppler shift $f_D$. In some radar systems, the Doppler shift can be eliminated by virtue of the distance being ascertained based on an up-chirp and a down-chirp for the distance measurement. Theoretically, the actual distance $d_T$ can be calculated as a mean value of the distance values that are obtained from a measurement with up-chirps and a further measurement with down-chirps. The averaging eliminates the Doppler shift.

An example of a signal processing technique for processing FMCW radar signals involves calculating what are known as range-Doppler maps, which are also referred to as range-Doppler images. In general, FMCW radar sensors ascertain the target information (i.e. distance, velocity, DoA/angle of azimuth) by transmitting a sequence of chirps (see FIG. 6, graph (a)) and mixing the (delayed) echoes from the radar targets with a "copy" of the transmitted signal (cf. FIG. 4, mixer 104). The resulting baseband signal y(t) is depicted in graph (b) in FIG. 6. This baseband signal y(t) can be divided into multiple segments, each segment of the baseband signal y(t) being associated with a respective particular chirp of the chirp sequence.

The aforementioned target information can be extracted from the spectrum of the aforementioned segments of the baseband signal y(t) that contain the chirp echoes (in the form of the aforementioned beat frequency) produced by one or more radar targets. A range-Doppler map is obtained, as explained in more detail below, by means of a two-stage Fourier transformation, for example. Range-Doppler maps can be used as a basis for different methods for detecting, identifying and classifying radar targets. The result of the first Fourier transformation stage is referred to as a range-map.

In the examples depicted in this document, the calculations necessary for ascertaining the range-Doppler maps will be performed by a digital computing unit comprising e.g. one or more signal processors (cf. FIG. 4, DSP 40). In other exemplary embodiments, in addition or as an alternative to a signal processor, other computing units can also be used in order to perform the necessary calculations. Depending on the implementation, the calculations can be performed by different firmware/software and hardware units (firmware/software and hardware entities) or combinations thereof. In general, the term computing unit is understood in this document to mean any combination of firmware/software and hardware that is able and designed to perform the calculations described in connection with the exemplary embodiments explained in this document.

According to one exemplary implementation, the calculation of a range-Doppler map involves two stages, with multiple Fourier transformations being calculated in each stage (e.g. by means of an FFT algorithm). According to the present example, the baseband signal y(t) (cf. FIG. 5) is sampled such that N×M samples are obtained, i.e. M segments each having N samples, for a (sub)sequence having M segments. That is to say that the sampling time interval $T_{SAMPLE}$ is chosen such that each of the M segments (chirp echoes in baseband) is represented by a sequence of N samples. As depicted in graph (c) in FIG. 6, these M segments can have N samples each arranged in a two-dimensional array Y[n, m] (radar data array). Each column in the array Y[n, m] represents one of the M considered segments of the baseband signal y(t), and the n-th row of the array Y[n, m] contains the n-th sample of the M chirps. The row index n (n=0, 1, ... N−1) can thus be regarded as a discrete time $n \cdot T_{SAMPLE}$ on a "fast" time axis. Equally, the column index m (m=0, 1, ... M−1) can be regarded as a discrete time $m \cdot T_{CHIRP}$ on a "slow" time axis. The column index m corresponds to the number of the chirp in a chirp sequence or the number of the associated segment of the (digitized) baseband signal.

In a first stage, a first FFT (usually referred to as a range FFT) is applied to each chirp. For each column of the array Y[n, m], the Fourier transformation is calculated. In other words, the array Y[n, m] is Fourier-transformed along the fast time axis, and the result obtained is a two-dimensional array R[k, m] of spectra that is referred to as a range map, each of the M columns of the range map containing N (complex-value) spectral values in each case. The Fourier transformation turns the "fast" time axis into the frequency axis; the row index k of the range map R[k, m] corresponds to a discrete frequency and is thus also referred to as a frequency bin k (k=0, 1, ..., N−1). Each discrete frequency corresponds to a distance according to equation (1), which is why the frequency axis is also referred to as a distance axis (range axis).

The range map R[k, m] is depicted in graph (c) in FIG. 6. A radar echo caused by a radar target results in a local maximum (peak) for a particular frequency index/frequency bin. Usually, this local maximum appears in all columns of the range map R[k, m], i.e. in the spectra of all considered segments of the baseband signal y(t) that are able to be associated with the chirps of a chirp sequence. As mentioned, the associated frequency index k (e.g. according to equation (1)) can be converted into a distance value.

In a second stage, a second FFT (usually referred to as a Doppler FFT) is applied to each of the N rows of the range map R[k, m] (k=0, ..., N−1). Each row of the range map R[k, m] contains M spectral values of a particular frequency bin k, each frequency bin k corresponding to a particular distance $d_{Ti}$ of a particular radar target $T_i$ (i.e. distance/range and frequency represent the same information). The Fourier transformation of the spectral values in a particular frequency bin k (associable with a radar target) allows the ascertainment of the associated Doppler frequency $f_D$ corresponding to a velocity of the radar target. In other words, the two-dimensional array R[k, m] (the range map) is Fourier-transformed row by row, i.e. along the "slow" time axis. The resulting Fourier transforms again form an array having N×M spectral values, which is referred to as a range-Doppler map X[k, l] (k=0, . . . , N−1 and l=0, . . . , M−1). The second FFT turns the "slow" time axis into the Doppler frequency axis on which the (Doppler) frequency bins are referenced by the index l. The associated discrete Doppler frequency values each correspond to a particular velocity. The Doppler frequency axis can accordingly be converted into a velocity axis (i.e. velocity and Doppler frequency represent the same information).

Each local maximum (each peak) in the range-Doppler map X[k, l] indicates a potential radar target. The row index k (on the range axis) associated with a local maximum represents the distance of the target, and the column index l (on the velocity axis) associated with the local maximum represents the associated velocity of the target. It goes without saying that the methods of ascertaining distance and velocity of radar targets based on the range-Doppler map that are described in this document are comparatively simple methods. Depending on the application, more complex and more extensive algorithms for evaluating range-Doppler maps can be used. In some applications, calculation of a range-Doppler map is not necessary. In these cases, distances and velocities of radar targets can be calculated e.g. based on the range map without the range-Doppler map needing to have been calculated beforehand.

In the case of multiple RX antennas, a range map and a range-Doppler map $X_a$[k, l] can be calculated for each RX channel, where a denotes the number of the antenna and of the associated RX channel. The range-Doppler maps $X_a$[k, l] can be "stacked" to produce a three-dimensional array. Equally, the output data $Y_a$[m, n] (radar data arrays) can be regarded as a three-dimensional array. This is sometimes referred to as a radar data cube. When there are multiple TX channels, multiple range-Doppler maps can be calculated for each RX channel, namely one range-Doppler map for each TX channel. That is to say that a range-Doppler map is obtained for each RX/TX channel pair. As mentioned above, combination of RX and TX channels allows virtual antenna elements of an antenna array to be formed. In this case, the index a represents the number of the virtual antenna, and a range-Doppler map $X_a$[k, l] can be ascertained for each virtual antenna.

As mentioned, the radar data cubes, the resulting range maps $R_a$[k, m] or the range-Doppler maps $X_a$[k, l] can be used as input data for various further signal processing methods. By way of example, various peak detection algorithms are known in order to detect local maxima (peaks), which are each caused by a radar target in the "field of view" of the radar sensor, in the range maps $R_a$[n, m] or the range-Doppler maps $X_a$[k, l]. Other algorithms are used e.g. for calculating the angle (of azimuth) of a radar target (cf. FIG. 10) or the classification of detected radar targets (e.g. whether a radar target is a pedestrian).

Figure 7:
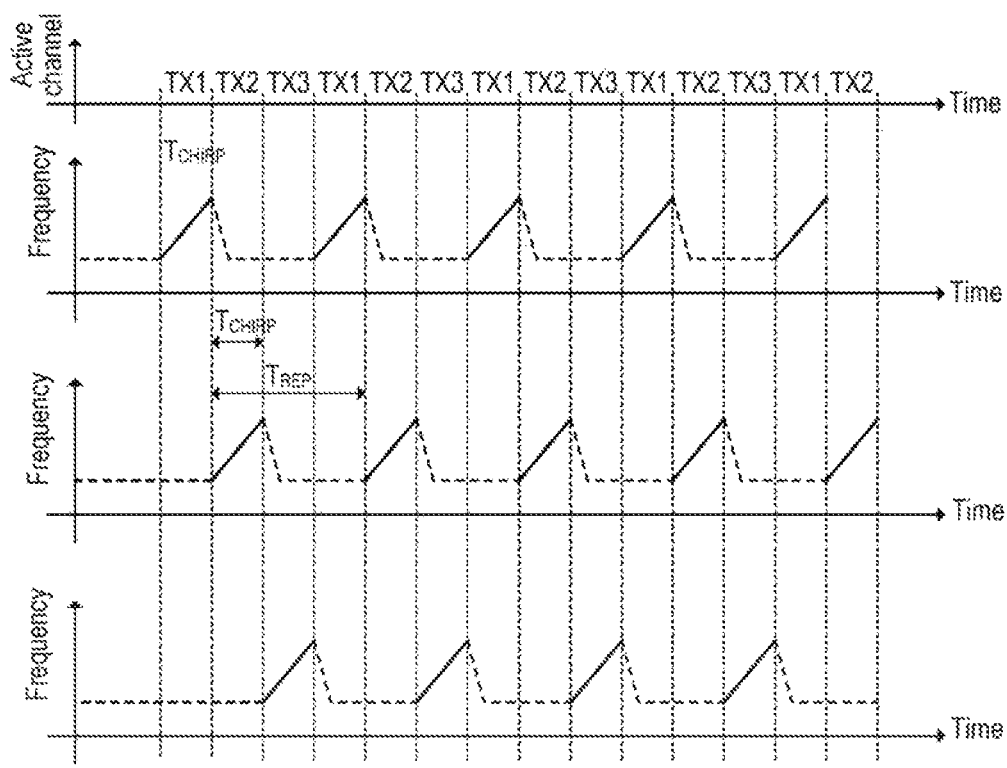
FIG. 7 uses a timing diagram to illustrate the operation of multiple transmission channels of a MIMO radar system by means of Time-Division multiplexing.

An MIMO radar system having three TX channels TX1, TX2, TX3 and two or more RX channels is considered below. When a measurement is performed, a sequence having a particular number of chirps is emitted, as already mentioned above. In the case of MIMO systems having multiple TX channels, there are various possible approaches that distribute chirps of a sequence over the different TX channels. FIG. 7 illustrates in exemplary fashion an approach that is usually referred to as Time Division Multiplexing (TDM). This involves the active TX channel being changed after each chirp, so that the first chirp is emitted via the first TX channel TX1, the second chirp is emitted via the second TX channel TX2, the third chirp is emitted via the third TX channel TX3, the fourth chirp is again emitted via the first TX channel TX1, etc. This scheme for transmitting the chirps via the three TX channels TX1, TX2 and TX3 results in the period duration $T_{REP}$ after which a chirp is repeated being at least three times as long in each TX channel as the chirp duration $T_{CHIRP}$. With an increasing number of TX channels, the ratio $T_{CHIRP}/T_{REP}$ becomes poorer and the chirp repetition rate $1/T_{REP}$ becomes correspondingly lower.

In each reception channel, a range-Doppler map can be calculated for each of the three transmission channels TX1, TX2, TX3, wherein the low chirp repetition rate $1/T_{REP}$ for the respective channel means that the maximum explicitly detectable velocity of a radar target is reduced. When there is just a single TX channel, it would be the case that $T_{REP}=T_{CHIRP}$ and the maximum explicitly detectable velocity would be correspondingly higher. With the TDM approach, there is therefore a tradeoff between the number of (virtual) antennas and the maximum resolvable velocity, with a greater number of antennas meaning a better angle resolution when determining the angle of azimuth. At this juncture, it should be noted that the maximum explicitly detectable velocity is not necessarily the upper end of the velocity measurement range. At higher velocities, aliasing effects occur in the range-Doppler map (as a result of which the explicitness is lost); however, tracking of an e.g. accelerating target can also be used to measure a velocity (and associate it with the target) that is higher than the maximum explicitly detectable velocity.

Figure 8:
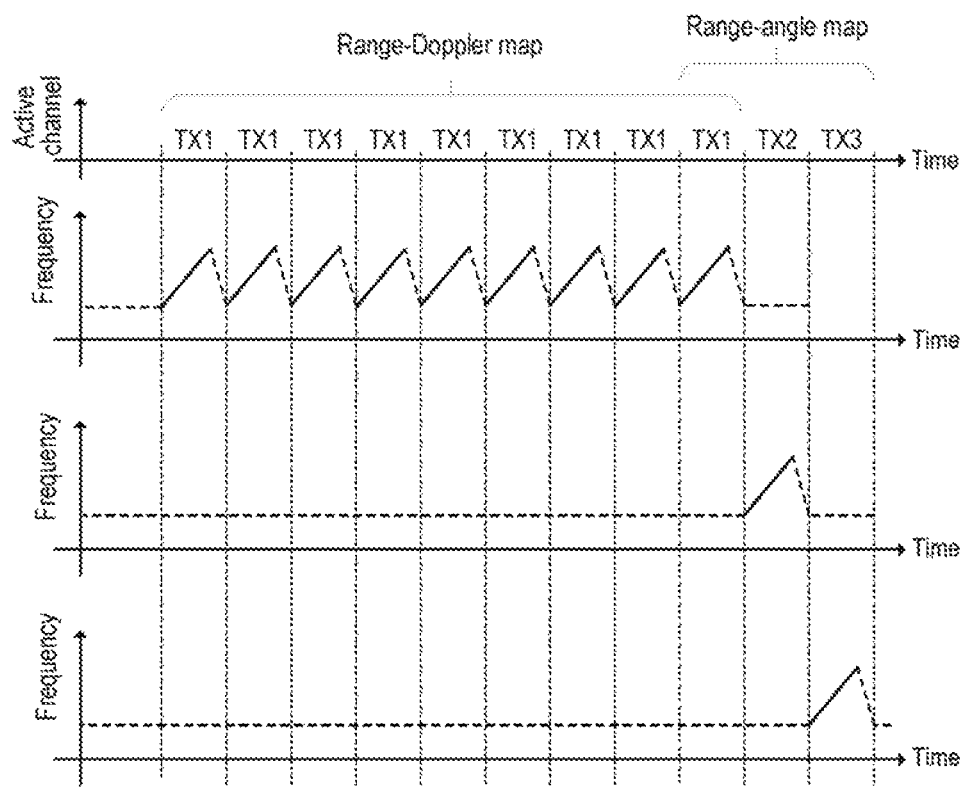
FIG. 8 uses a timing diagram to illustrate the operation of multiple transmission channels of a MIMO radar system for determining distance (range), velocity and angle of azimuth.
Figure 9:
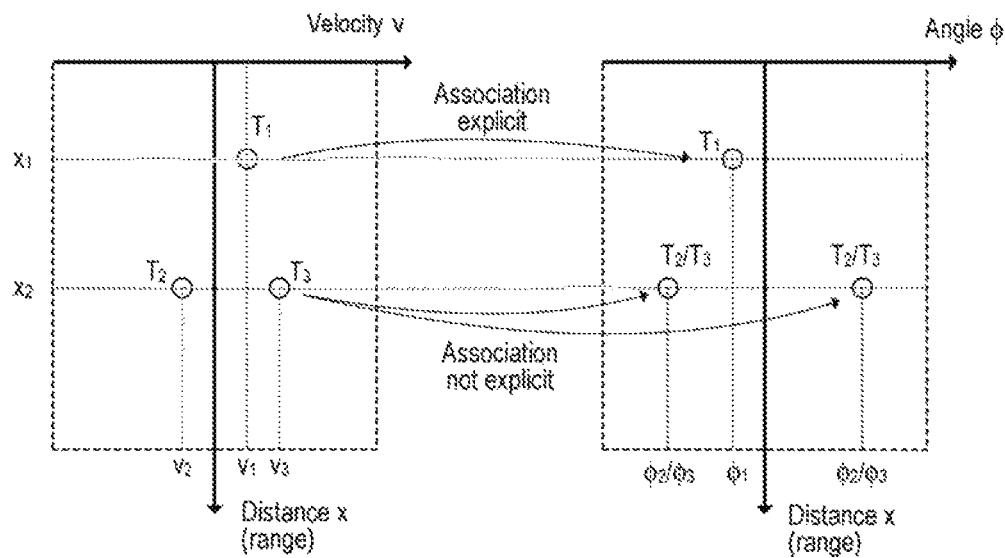
FIG. 9 illustrates in exemplary fashion the digital signal processing of radar signals when detecting radar targets in the range-angle space.

FIG. 8 illustrates a further approach that the exemplary embodiments described in this document also use and that involves—within a frame—a first subsequence of directly successive chirps initially being emitted via the first TX channel TX1. Subsequently, the first subsequence is directly followed by a chirp being emitted via the second TX channel TX2 and a chirp being emitted via the third TX channel TX3. In this case, the period duration $T_{REP}$ for the first TX channel TX01 is equal to the chirp duration $T_{CHIRP}$, and a range-Doppler map having a higher maximum velocity than in the previous example can be calculated. Based on the last chirp of the first subsequence and the chirps emitted via the TX channels TX2 and TX3 (i.e. from the associated digital radar signals y[n] in the individual reception channels), a range-angle map can be calculated that can be used for determining the angle of azimuth. FIG. 9 uses a schematic example to illustrate the result of said calculations. The calculation of a range-angle map is subsequently discussed with reference to FIG. 10.

As will be explained later on, each of the TX channels TX2 and TX3 can also be used to send more than one chirp within a frame, wherein typically the number of chirps used to calculate distance and velocity (i.e. the range-Doppler map) that is sent via the first channel TX1 is greater than the number of those chirps in the subsequences of the channels TX2 and TX3 that are used just to calculate the angles associated with the targets. It must further be mentioned that the order within the frame is not set at the order shown in FIG. 8, in the case of which first of all those chirps that are used for calculating distance and velocity are transmitted, followed by those chirps that are used just for the angle calculation. Rather, within a frame, it is also possible for the chirps for the angle calculation to be transmitted via the TX channels TX2 and TX3 first, followed directly by the chirps via the TX channel TX1 that are used for the distance/velocity calculation. It should also be noted that although just one frame is depicted in FIG. 8, a multiplicity of frames are transmitted in succession during operation. In other words, the frame sequence depicted in FIG. 8 is transmitted repeatedly during operation, with the calculation of the distance, velocity and angle (DoA) taking place after each frame sequence, as depicted below.

The left-hand part of FIG. 9 shows a range-Doppler map having three detected local maxima, which can each represent a real radar target. According to the present exemplary embodiment, this range-Doppler map can be calculated based on the subsequence emitted via the first TX channel TX1. In FIG. 9, the targets and the corresponding local maxima are denoted by $T_1$, $T_2$ and $T_3$ in the range-Doppler map. It is possible to see the position of $T_1$ at a distance (range) of $x_1$ and a corresponding velocity $v_1$. The target $T_2$ is at a distance of $x_2$ at a velocity $v_2$, and the target $T_3$ is at a distance of $x_3 \approx x_2$ at a velocity $v_3$. In other words, each target $T_1$, $T_2$, $T_3$ (local maximum) detected in the range-Doppler map can be assigned a distance value (range) and a velocity value. It goes without saying that discrete values (indices) along the range axis and along the velocity (Doppler) axis are discrete frequency values, but these frequency values can be converted directly into distances and velocities. In this respect, it is also possible for the discrete frequency indices k,l to be regarded as "distance values" and "velocity values".

The right-hand part of FIG. 9 shows the same targets $T_1$, $T_2$ and $T_3$ in the corresponding range-angle map, which can be calculated based on at least three chirps emitted via different channels. The angle of azimuth $\phi_1$ of the target $T_1$ can be ascertained explicitly from the range-angle map. An explicit association is not possible for the targets $T_2$ and $T_3$, however, since both targets $T_2$ and $T_3$ are at approximately the same distance from the sensor ($x_3 \approx x_2$). In the range-angle map, the two local maxima are found at the distance coordinate $x_2$, which the targets $T_2$ and $T_3$ represent, but the range-Doppler map and the range-angle map cannot easily be used to decide which local maximum in the range-angle map (i.e. which angle) at the distance $x_2$ needs to be associated with the target $T_2$ and which needs to be associated with the target $T_3$. This problem of nonexplicit associability (in regard to the angle) arises whenever multiple targets at the same distance or at a similar distance are detected, i.e. when multiple targets cause overlapping signal components in the same frequency bin k (corresponds in the example from FIG. 9 to a distance value $x_2$). Overlapping signal components are therefore signal components that, according to the algorithm used, are identified as signal components of a potential target and are associated with the same bin in a range-Doppler map, but are separate from one another in the bin, i.e. are associated with the same distance but different velocities. The "overlapping signal components" property can thus be detected by establishing whether two or more targets have the same distance value or at least a similar distance value (e.g. in accordance with the adjacent frequency bin), the targets being able to have different velocities. The overlap thus occurs in the range dimension (same or similar distance), but not necessarily in the Doppler dimension.

At this juncture, it should be pointed out that a particular distance value x strictly speaking represents a distance range from $x-\Delta x/2$ to $x+\Delta x/2$, $\Delta x$ corresponding to the distance resolution. The distance resolution corresponds to the bandwidth of the transmission signal (chirp) (cf. FIGS. 3 and 4, ADC 30). These relationships are known to a person skilled in the art, however, and are therefore not explained further in this document.

Figure 10:
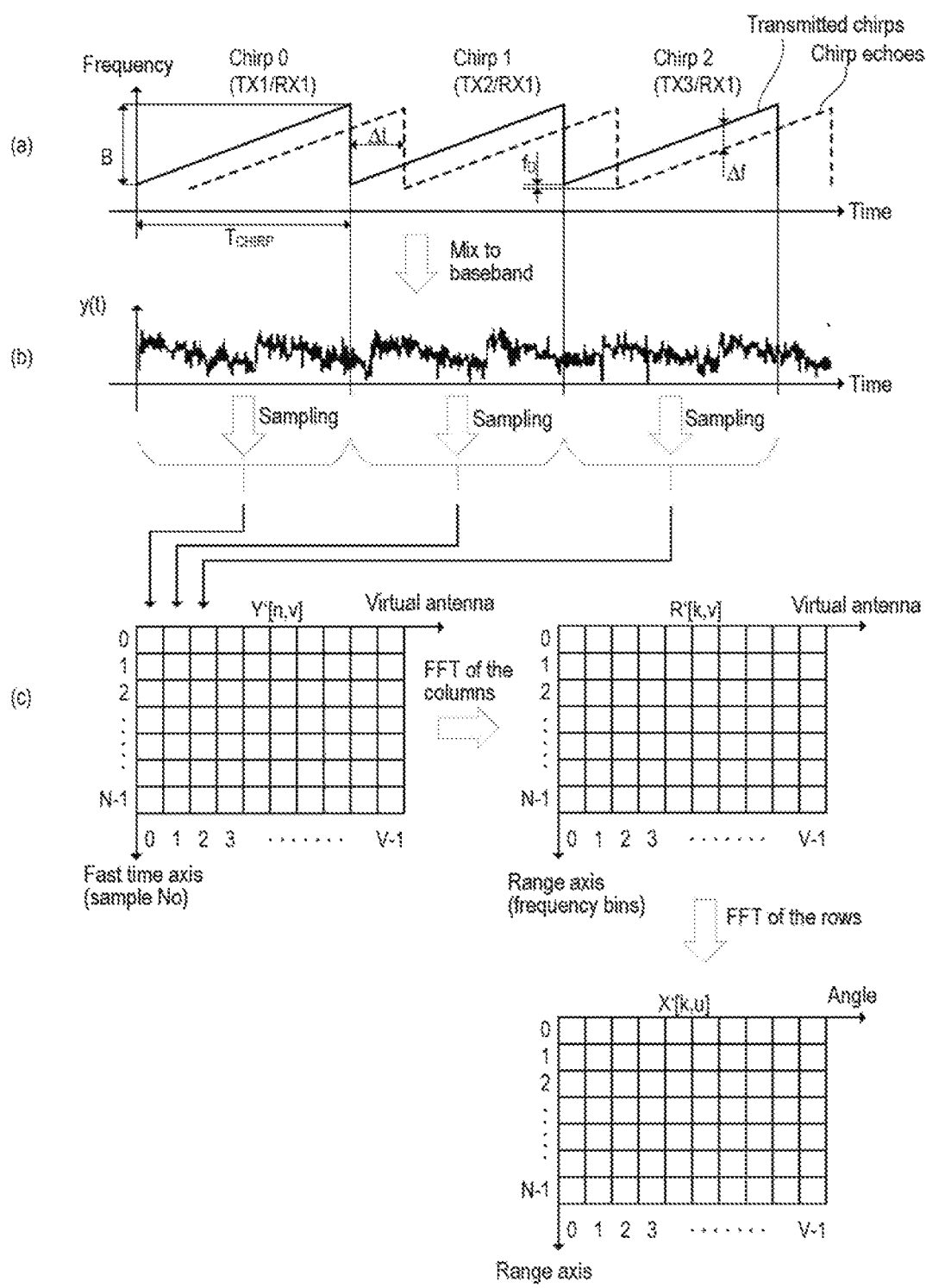
FIG. 10 illustrates the range-Doppler map (distance-velocity map) and range-azimuth map (distance-angle map) belonging to the example in FIG. 8.

Before various approaches for solving the aforementioned problem of nonexplicit associability are discussed, the calculation of a range-angle map is explained below with reference to FIG. 11 on the basis of an example. FIG. 10 schematically illustrates the calculation of a range-angle map that can be used to determine the distance and angle of azimuth of a radar target. The calculation is very similar to the calculation of a range-Doppler map depicted in FIG. 6. However, in the present case—unlike in the example shown in FIG. 6—it is not a sequence of chirps sent via a particular TX channel and received via a particular RX channel that is considered but rather a sequence of chirps that have been received by different (virtual) antennas. As already mentioned, a combination of TX and RX antennas can form an array of virtual antennas, wherein when there are nix TX antennas it is possible for nix virtual RX antennas to be associated with each RX antenna. With a system having nix TX antennas and $n_{RX}$ RX antennas, an antenna array having $V=n_{TX} \times n_{RX}$ virtual RX antennas (and one virtual TX antenna) can be formed.

In the example considered in FIG. 10, a sequence of V RF signal segments is considered that have each been received via V different virtual antennas. These RF signal segments can contain a real echo of a transmitted chirp. Graph (a) in FIG. 10 shows the aforementioned sequence in the RF band and graph (b) shows the corresponding sequence in baseband. The corresponding digitized signal segments in baseband can be organized, analogously to the example from FIG. 6, in a matrix r [n, v] having N×V values (see graph (c) in FIG. 10), wherein the signal segment of the v-th virtual antennas is arranged in the v-th column of the matrix (v=0, 1, . . . , V−1). The row index n denotes in each case one sample within a segment (n=0, 1, . . . , N−1). The index axis along the rows is referred to as the "fast time axis" as in FIG. 10.

The range-angle map can—analogously to the range-Doppler map—be calculated by means of two-stage Fourier transformation. In a first stage, the FFTs of the columns are calculated, as a result of which the matrix R' [k, v] is obtained. The fast time axis becomes the range axis as a result of the transformation (cf. FIG. 6). This first FFT stage has already been carried out for the calculation of the range-maps shown in FIG. 6 and usually does not need to be repeated for the calculation of the range-angle map. In a second stage, the FFTs of the rows of the matrix R' [k, v] are calculated (angle FFT). The result obtained is the range-angle map X' [k, u], in which the radar targets can be detected as in a range-Doppler map. Instead of the velocity information, the index u on the index axis along the columns represents angle information.

As depicted in FIG. 9, situations can arise in which targets detected in a range-Doppler map cannot be explicitly associated with targets detected in the range-angle map. Various methods known per se can be used for detecting the targets, for example methods that can detect local maxima (caused by real radar targets) by means of comparison with a threshold value. By way of example, for radar applications, what are known as CFAR methods are customary, in which the threshold value is dependent on the noise that the signal contains (CFAR means constant false alarm rate). Such detection methods are known per se and are not explained further in this document.

Figure 11:
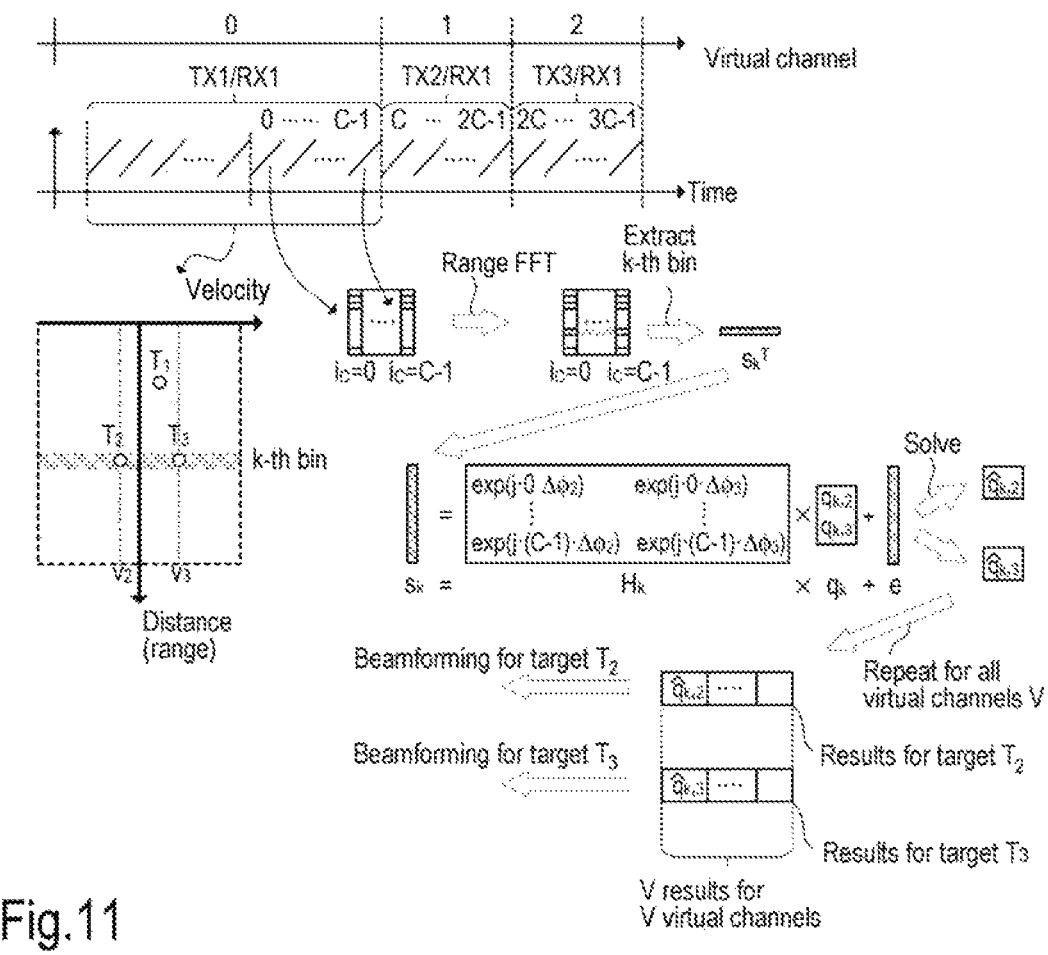
FIG. 11 schematically illustrates an example of a signal processing technique that can be used in MIMO systems to determine the associated angle of azimuth for detected radar targets.

FIG. 11 illustrates an example of a method that permits two or more targets whose detected distance values are the same or similar to be separated and the resulting separate values to be used in subsequent beamforming algorithms. A digital radar signal (in baseband) made up of a multiplicity of signal segments is considered below. The considered sequence (frame) of signal segments contains the digitized data captured during a measurement, each signal segment of the sequence being able to be associated with one chirp of a transmitted RF radar signal (cf. FIGS. 6 and 10). Subsequences of the sequence of signal segments can be associated with different virtual antennas. That is to say that one subsequence of signal segments comes from a specific RX channel and is based on chirps emitted via a specific TX channel. As such, for example in FIG. 11, the successive signal segments received via the virtual antenna 0 (which is associated with the pair TX1/RX1) correspond to a specific subsequence of the signal segments. In the same way, the signal segments received via the virtual antenna 1, 2, etc. correspond to further subsequences of the signal segments.

According to FIG. 11, one or more radar targets are first of all detected on the basis of a first subsequence of M successive signal segments (of N samples each). The first subsequence having M successive signal segments is associated with the virtual antenna 0 and corresponds to a transmission of M successive chirps via a first TX channel TX1 that, following reflection from an object, are each received in an RX channel RX1, the analog-to-digital conversion generating in each case N samples per signal segment (chirp). In the exemplary embodiment depicted, the signal segments of the first subsequence are used to calculate a range-Doppler map X[k, l], in which radar targets $T_1$, $T_2$ and $T_3$ are then detected e.g. by means of detection of local maxima (k=0, 1, ..., N−1, l=0, 1, ... M−1, cf. FIG. 6). Similar to the example from FIG. 9, it can arise that two targets $T_2$ and $T_3$ are detected at approximately the same distance value in the k-th frequency bin, so that signal components based on the target $T_2$ and signal components based on the target $T_3$ overlap (see FIG. 11). As already mentioned, the k-th frequency bin corresponds to a definite discrete distance value x that actually, however, as mentioned, represents a certain range of distance values (e.g. from x−Δx/2 to x+Δx/2). That is to say that when e.g. the same discrete distance value is ascertained for two objects below, this must be understood to mean that the two distance values are within the distance value range of the respective bin, which is limited by the bin limit values of a respective bin. The velocities of the targets $T_2$ and $T_3$, $v_2$ and $v_3$, can likewise be ascertained from the range-Doppler map. The signal segments of the first subsequence come from a virtual antenna. That is to say that, for the present example, a corresponding subsequence (of a frame) of chirps is emitted via the TX channel TX1 and a corresponding subsequence of signal segments in baseband is received via the RX channel RX1. The combination TX1/RX1 in this case represents a virtual antenna (virtual RX channel).

If—as in the present example from FIG. 11—a group of radar targets $T_2$, $T_3$ having (overlapping) signal components has been detected in the same frequency bin k (corresponds to a specific discrete distance value), then, as mentioned, explicit calculation of an angle of azimuth is problematic (cf. FIG. 9). In order to separate the signal components of the targets $T_2$, $T_3$ (at the velocities $v_2$ and $v_3$) of the aforementioned group, associated spectral values $q_{k,2}$, $q_{k,3}$ are—as depicted schematically in FIG. 11—calculated for the radar targets $T_2$, $T_3$ of the group of radar targets. The spectral values $q_{k,2}$, $q_{k,3}$ are complex numerical values in this case, which are calculated based on a second subsequence of signal segments and the velocities $v_2$, $v_3$ ascertained for the targets $T_2$, $T_3$. The second subsequence of signal segments can likewise be associated with a virtual antenna (i.e. a virtual RX channel), wherein the second subsequence can be a portion of the first subsequence, but does not have to be. By way of example, the second subsequence can be the subsequence from 0 to C−1 depicted in FIG. 11, which corresponds to a number C of successive chirps transmitted via the TX channel TX1 and received by the RX channel RX1 (virtual antenna 0). Equally, a further subsequence can be formed by C successive chirps that have been transmitted via the TX channel TX2, etc.

The signal segments of the second subsequence can be organized (analogously to FIG. 6 or 10) as columns of a matrix Y"[n, $i_C$] containing C signal segments of N samples each (n=0, 1, ..., N−1, $i_C$=0, 1, ..., C−1). The index $i_C$ denotes the respective signal segment, and the index n denotes the sample within a signal segment. A column-by-column Fourier transformation (range FFT) returns the matrix S[k, $i_C$], which is substantially a range map (cf. FIG. 6, range map R[k, m]). From the aforementioned target detection in the range-Doppler map X[k, l], it is already known that there are signal components of the targets $T_2$ and $T_3$ in the k-th frequency bin. The (complex) spectral values that this k-th frequency bin contains can be written as a row vector $s_k^T$ (the superscript T means "transposed").

The vector $s_k$ contains $i_C$ elements (corresponds to the number of segments of the second subsequence). Since the spectral values that the vector $s_k$ contains are substantially caused by the targets $T_2$ and $T_3$, the vector $s_k$ can be broken down as follows:

$$s_k = H_k \cdot \underbrace{\begin{pmatrix} q_{k,2} \\ q_{k,3} \end{pmatrix}}_{q_k}. \tag{2}$$

In this case, $H_k$ denotes a C×2 matrix (for a group having two targets $T_2$, $T_3$) that the velocity-dependent segment-to-segment phase shifts $\Delta\phi_2$ and $\Delta\phi_3$ that can be associated with the two targets $T_2$, $T_3$ contain. The associated velocities $v_2$, $v_3$ have previously already been ascertained on the basis of the previously calculated range-Doppler map R[k, l]. Therefore—with two targets $T_2$, $T_3$—the following structure is obtained for the matrix $H_k$:

$$H_k = \begin{pmatrix} 1 & 1 \\ \exp(j \cdot 1 \cdot \Delta\phi_2) & \exp(j \cdot 1 \cdot \Delta\phi_3) \\ \vdots & \vdots \\ \exp(j \cdot (C-1) \cdot \Delta\phi_2) & \exp(j \cdot (C-1) \cdot \Delta\phi_3) \end{pmatrix}. \tag{3}$$

The $i_C$-th row of the matrix thus contains the phase terms $\exp(j \cdot i_C \cdot \Delta\phi_2)$ and $\exp(j \cdot i_C \cdot \Delta\phi_3)$ (for $i_C$=0, 1, ..., C−1). The function exp(•) denotes the exponential function. When there are more than two targets, the matrix $H_k$ accordingly has more than two columns and the vector $q_k$ accordingly has more than two rows. Essentially, the matrix $H_k$ causes a back-transformation of the phase shifts caused by the velocity of a target (target $T_2$ or $T_3$) to the phase of the first signal segment ($i_C$=0) of the second subsequence. This takes into consideration that the signal segments are captured at different times and, owing to the velocity of the respective target, the phase changes from one signal segment (corresponds to a chirp) to the next.

Equation (2) represents an overdetermined equation system that can be solved approximately. Various approaches for calculating approximate solutions are known per se, these not being discussed more specifically in this document. Usually, the approximate solution $\hat{q}_k = (\hat{q}_{k,2}, \hat{q}_{k,3})^T$ is calculated such that a norm lie II of the error e becomes minimal, i.e.

$$\|e\| = \left\| s_k - H_k \cdot \begin{pmatrix} \hat{q}_{k,2} \\ \hat{q}_{k,3} \end{pmatrix} \right\| = \min \left\{ \left\| s_k - H_k \cdot \begin{pmatrix} q_{k,2} \\ q_{k,3} \end{pmatrix} \right\| \right\}. \quad (4)$$

The calculation of the approximate solution $q_k$ can be repeated for each virtual RX channel (i.e. for each RX/TX channel pair). When there are V virtual channels, V spectral values are accordingly obtained for each target $T_2$, $T_3$ of the considered group of targets (for the range index/frequency bin k), said spectral values being able to be taken as a basis for calculating (e.g. by means of Fourier transformation) the angle of azimuth of the targets $T_2$, $T_3$ (e.g. as explained with reference to FIG. 10).

The method described with reference to FIG. 11 permits the overlapping (in the frequency domain) signal components (represented by the approximate solutions $\hat{q}_{k,2}$ and $\hat{q}_{k,3}$), caused by the different radar targets (e.g. $T_2$ and $T_3$) of a group of radar targets in a specific frequency bin (corresponds to a specific distance value) to be separated. This process could also be referred to as signal decomposition. Superposition of the approximate solutions with the correct phase would (approximately) yield the vector $s_k$, which in turn corresponds to the considered k-th bin of the range map. The aforementioned approximate solution $\hat{q}_k$ contains these separated signal components $\hat{q}_{k,2}$ and $\hat{q}_{k,3}$. These can be calculated for each virtual reception channel of the radar system, and these results can be used for calculating the angles associated with the respective radar targets, this association being exclusive on the basis of the aforementioned separation (unlike in the example from FIG. 9).

The separated signal components $\hat{q}_{k,2}$ and $\hat{q}_{k,3}$ ascertained for each virtual channel v can be organized as row vectors $(\hat{q}_{k,2}(v=0), \ldots, \hat{q}_{k,2}(V=V-1))$ or $(\hat{q}_{k,3}(v=0), \ldots, \hat{q}_{k,3}(v=V-1))$.

These row vectors have substantially the same meaning as a row of the matrix R' [k, v] in the example from FIG. 10. Fourier transformation (angle FFT) of the aforementioned row vectors and detection of the maxima can be used in a manner known per se to determine an angle of azimuth and hence the DoA. This angle is explicitly associable—in the example from FIG. 11—with the respective target $T_2$ or $T_3$. Theoretically, situations can arise in which two or more angles are detected for a target (e.g. target $T_2$). That is to say that the relevant target is in reality two or more targets that are each at the same distance and each have the same velocity, but are seen at different angles by the radar system.

Figure 12:
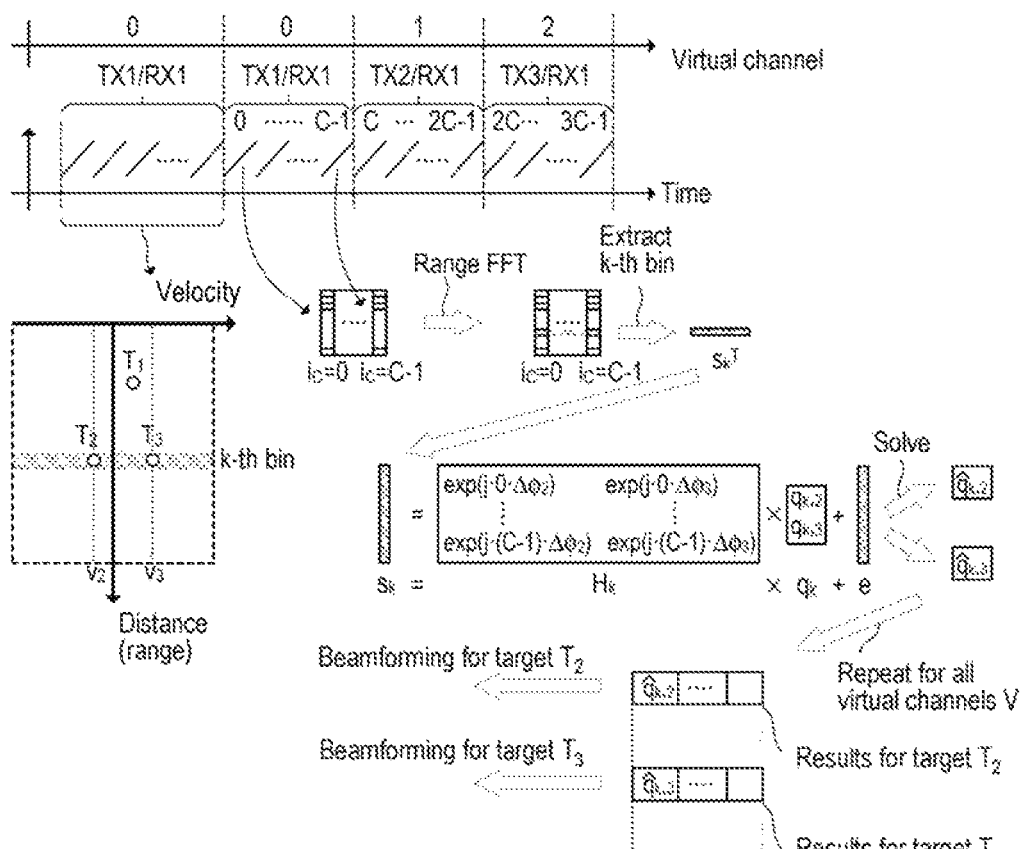
FIGS. 12 and 13 illustrate in exemplary fashion various modifications of the example from FIG. 11.

In the case of the example depicted in FIG. 11, the second subsequence (having C signal segments) is a portion of the first subsequence, from which the range-Doppler map used to detect distance and velocity values of targets is calculated. This does not necessarily have to be the case, however. FIG. 12 illustrates a modification of the example described with reference to FIG. 11 in which the second subsequence is not part of the first subsequence, but rather follows it. The second subsequence can (but does not have to) be delivered by the same virtual channel as the first subsequence. As already mentioned, the algorithm depicted in FIGS. 11 and 12 is repeated for further subsequences (which are each delivered by other virtual channels), so that a total of V spectral values are obtained for each target of a group of targets that causes signal components in a specific frequency bin k (when there are V virtual channels). In exemplary embodiments, the number of available virtual channels (RX/TX combinations) typically corresponds to the number of different subsequences used for calculating the angle.

Figure 13:
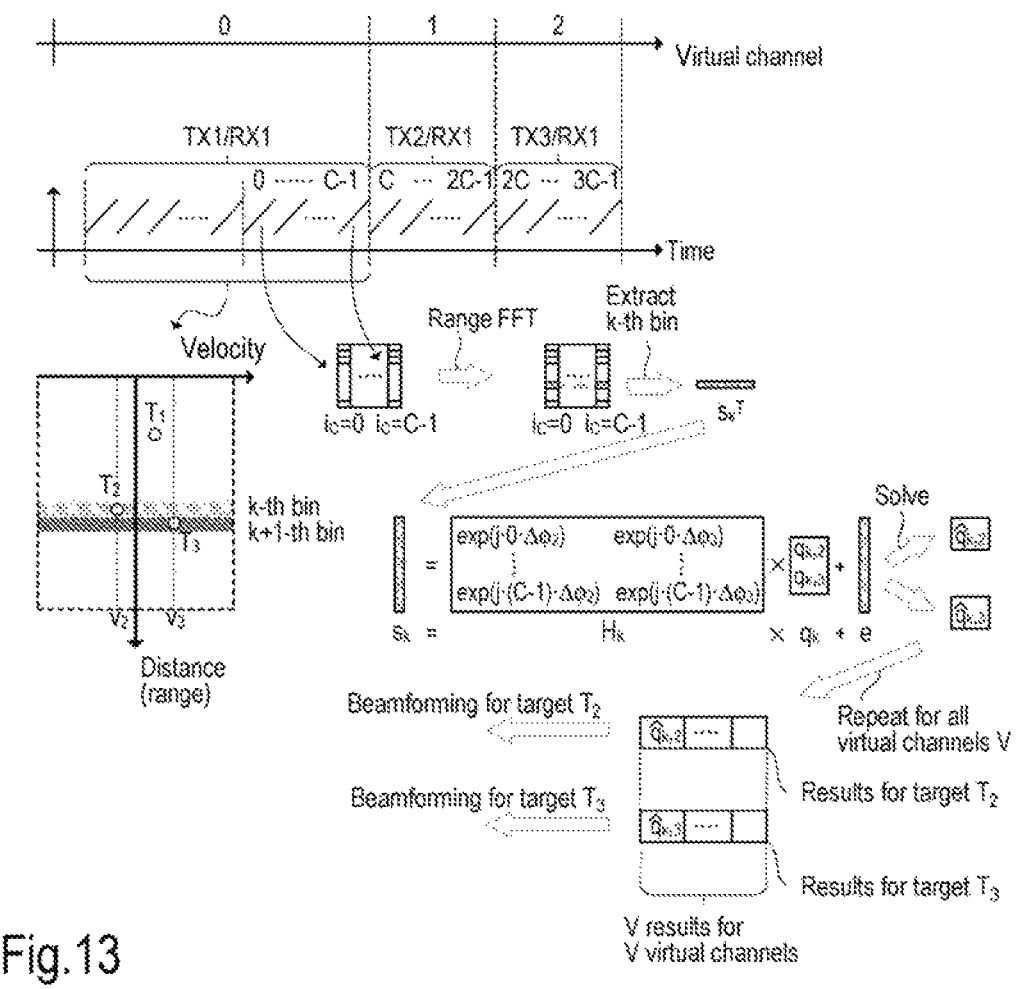

FIG. 13 illustrates a further modification of the example described with reference to FIG. 11. In the case shown in FIG. 13, the local maxima associable with the targets $T_2$ and $T_3$ are not in the same frequency bin k on the range axis in the range-Doppler map, but rather in two (immediately or closely) adjacent frequency bins, e.g. k and k+1. The local maxima are not necessarily strictly limited to one frequency bin, however. Rather, the "main lobe" associated with a local maximum may also be "blurred" over multiple adjacent frequency bins. Therefore, even in the case depicted in FIG. 13, it may make sense to use the technique explained above with reference to FIGS. 11 and 12, the two frequency bins k and k+1 being processed separately in this case. The result obtained—for each considered virtual channel $v=0, 1, \ldots, V-1$—is the estimated spectral values $\hat{q}_k = (\hat{q}_{k,2}, \hat{q}_{k,3})^T$ and $\hat{q}_{k+1}(\hat{q}_{k+1,2}, \hat{q}_{k+1,3})^T$ for the frequency bins k and k+1. For broader main lobes, it may be necessary or make sense to also process more than two adjacent bins. Theoretically, the method can be applied to all frequency bins of a range-Doppler map, the calculations described above making sense only if two adjacent radar targets (e.g. $T_2$ and $T_3$) cause significant signal components in the same frequency bin on the range axis of a range-Doppler map. If only one target is detected in a specific bin (which can also be the case when two targets are at the same distance and the same velocity), the matrix $H_k$ (cf. equation (3)) "degenerates" into a vector and the equation system becomes mathematically trivial, since in this case it is no longer necessary for two targets at different velocities to be "separated".

Figure 14:
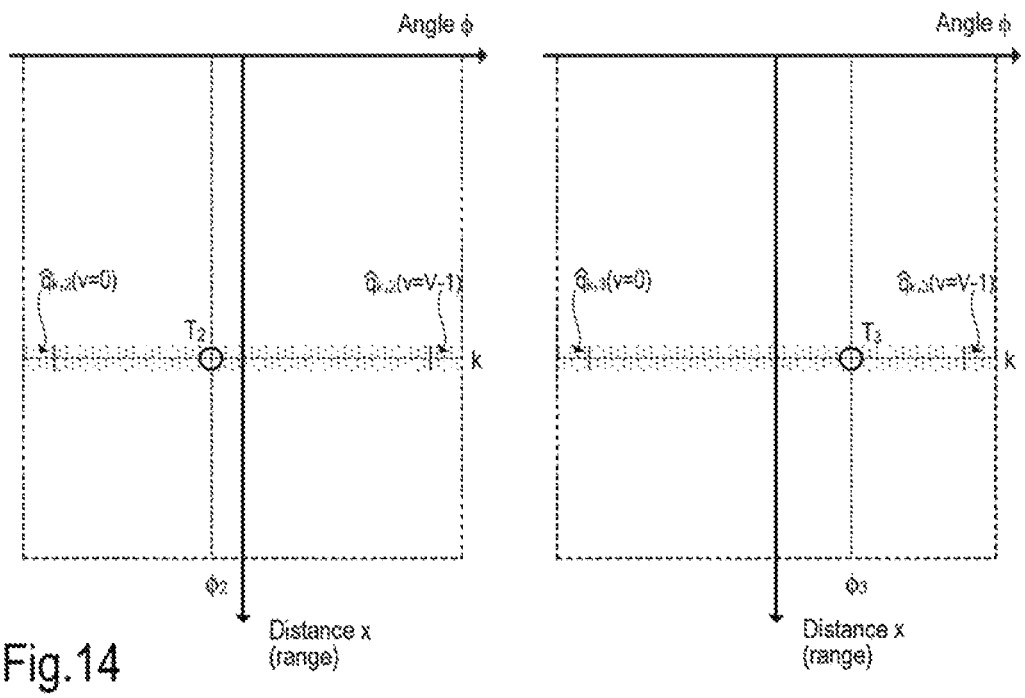
FIGS. 14 and 15 visualize in exemplary fashion the results of the techniques depicted in FIGS. 11 and 13
Figure 15:
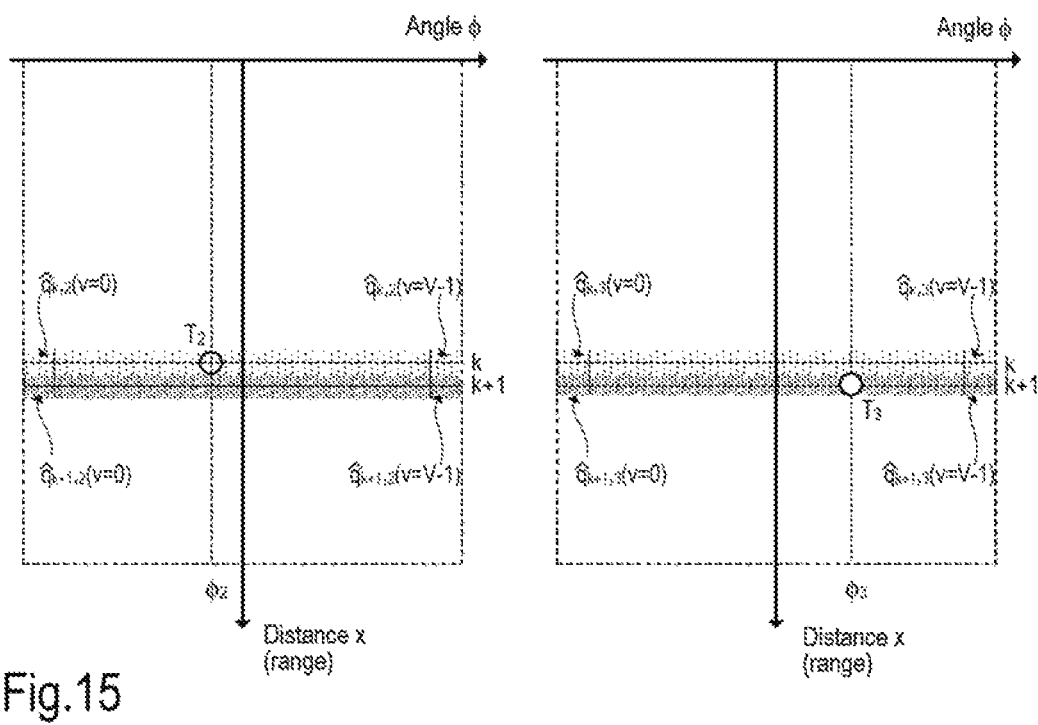

FIGS. 14 and 15 serve to visualize the results obtained by means of the methods shown in FIGS. 11 and 13 and the method shown in FIG. 13, respectively. The results (i.e. the approximate solutions $\hat{q}_k$ for a multiplicity of virtual channels) of the calculations depicted in FIGS. 11 to 13 can be interpreted as part of a type of range map, similarly to the matrix R' [k, v] in FIG. 10. The Fourier transforms thereof can be interpreted as part of a range-angle map, similarly to the graph depicted in FIG. 9 (on the right), wherein the targets $T_2$ and $T_3$ (see FIG. 9) having signal components in the same frequency bin k (or in adjacent frequency bins) can be separated. A separate range-angle map is thus obtained for each of these targets $T_2$ and $T_3$, only those portions of the range-angle map that are relevant to the ascertainment of the angle, that is to say the spectral values in the k-th frequency bin and possibly in adjacent bins, being calculated. This separation of the range-angle maps allows explicit association of distance (range), velocity and angle with the individual targets $T_2$ and $T_3$, which is not possible in the example from FIG. 9.

As mentioned, the calculation (estimation) of the spectral values $\hat{q}_k = (\hat{q}_{k,2}, \hat{q}_{k,3})^T$ depicted in FIGS. 11 to 13 can be repeated for each virtual reception antenna $v=0, 1, \ldots, V-1$. A first set of V estimated spectral values $\{\hat{q}_{k,2}(v=0), \hat{q}_{k,2}(v=1), \ldots, \hat{q}_{k,2}(v=V-1)\}$ associated with the target $T_2$ and a second set of V estimated spectral values $\{\hat{q}_{k,3}(v=0), q_{k,3}(v=1), \ldots, q_{k,3}(v=V-1)\}$ associated with the target $T_3$ are thus obtained—in the considered k-th frequency bin. Each set of V spectral values is then used to perform an FFT (angle FFT). Following performance of the angle FFT for each of the targets $T_2$, $T_3$, (row-by-row FFT, see FIG. 10), one vector is therefore obtained for each target $T_2$, $T_3$, with that component of the vector that has the maximum absolute value typically indicating the angle for the respective target. The result of the angle FFT can therefore be regarded as part of a range-angle map. The method is performed for all frequency bins in which targets at the same distance have been detected. The angle FFT is therefore calculated for those rows k for which a group of targets has previously been detected. The result is visualized in FIG. 14; a (partial) range-angle map is obtained for each target $T_2$, $T_3$ from the considered group of targets that have been detected in the k-th frequency bin. The k-th frequency bin in each range-angle map contains precisely one local maximum representing precisely one target. Owing to this separation of the range-angle maps, the problem of lack of explicitness mentioned in connection with FIG. 9 does not arise. For frequency bins having only one target peak (local maximum of the absolute value), the method can be applied analogously, with the matrix $H_k$ (cf. equation (3)) becoming a vector as explained above and the equation system for determining the spectral values becoming mathematically simple. As explained above, the set of spectral values is then used to perform an FFT in order to obtain the applicable angle information.

In the example from FIG. 13, spectral values are calculated for the frequency bins k and k+1. In a general example, the spectral values are calculated for multiple adjacent frequency bins (for each virtual channel). The result is visualized in FIG. 15. Multiple range-angle maps are again obtained, one for each target of the considered group of targets, these range-angle maps comprising not just one frequency bin k but rather several, namely the considered set of adjacent frequency bins, in the present example the frequency bins k and k+1. As already mentioned above with reference to FIG. 14, the ascertained angle values can be explicitly associated with the individual targets on the basis of the separation of the targets.

What is claimed is:

1. A method, comprising:
    transmitting a sequence of radio frequency (RF) chirps via at least one of a first transmission channel and a second transmission channel, including transmitting a first subsequence of successive chirps and a second subsequence of successive chirps;
    generating, by a reception channel, a digital radar signal having a sequence of signal segments from chirp echoes corresponding to the sequence of RF chirps, wherein each signal segment of the sequence is respectively associated with a different chirp of the sequence of RF chirps;
    generating a range-Doppler map based only on a first subsequence of successive signal segments of the sequence of signal segments, wherein the first subsequence of successive signal segments correspond to the first subsequence of successive chirps;
    detecting radar targets in the range-Doppler map, including determining a distance value and a velocity value for each detected radar target from the range-Doppler map;
    ascertaining whether the detected radar targets comprise a group of radar targets having overlapping signal components in a distance dimension of the range-Doppler map; and
    in response to detecting the group of radar targets having the overlapping signal components, calculating a spectral value for each radar target of the group of radar targets having the overlapping signal components based on a second subsequence of successive signal segments of the sequence of signal segments and based on velocity values, ascertained from the range-Doppler map, that correspond to the radar targets of the group of radar targets, wherein the second subsequence of successive signal segments correspond to the second subsequence of successive chirps,
    wherein the second subsequence of successive chirps has a smaller number of chirps than the first subsequence of successive chirps.

2. The method as recited in claim 1, wherein the calculation of the spectral value for each radar target of the group of radar targets comprises:
    transforming the second subsequence of successive signal segments into a frequency domain in order to obtain corresponding spectra;
    extracting values from a frequency bin of the obtained corresponding spectra that is associated with the group of radar targets; and
    estimating a spectral value for each radar target of the group of radar targets based on the extracted values.

3. The method as recited in claim 2, wherein the estimation of the spectral value for each radar target of the group of radar targets further comprises:
    calculating an approximate solution for an overdetermined equation system using a coefficient matrix that is dependent on the velocity values ascertained for the group of radar targets, and using a vector of input values that correspond to the extracted values.

4. The method as recited in claim 1, further comprising:
    calculating the spectral value for each radar target of the group of radar targets based on a third subsequence of successive signal segments of the sequence of signal segments and further based on the distance values and the velocity values ascertained for the group of radar targets from the range-Doppler map,
    wherein the second subsequence of successive signal segments are associated with the second subsequence of successive chirps emitted via the first transmission channel, and the third subsequence of successive signal segments are associated with a third subsequence of successive chirps emitted via the second transmission channel.

5. The method as recited in claim 4, wherein the second subsequence and the third subsequence are of equal length.

6. The method as recited in claim 1, wherein generating the digital radar signal comprises:
    receiving an RF radar signal comprising the chirp echoes in a reception channel and down-converting the received RF radar signal; and
    generating the digital radar signal based on the down-converted RF radar signal.

7. The method as recited in claim 6, further comprising:
    if the group of radar targets having the overlapping signal components is detected, repeating calculating of a further spectral value for each radar target of the group of radar targets for digital radar signals from different reception channels.

8. The method as recited in claim 7, further comprising:
calculating angles of azimuth of radar targets of the group of radar targets based on the calculated further spectral values.

9. The method as recited in claim 1, wherein the first subsequence of successive signal segments is associated with the first subsequence of successive chirps emitted via the first transmission channel, and
wherein the second subsequence of successive signal segments is associated with the first subsequence of successive chirps emitted via the second transmission channel.

10. A system, comprising:
a radar transceiver having a reception channel, a first transmission channel, and a second transmission channel,
wherein the radar transceiver is configured to transmit a sequence of radio frequency (RF) chirps via at least one of the first transmission channel and the second transmission channel, including transmitting a first subsequence of successive chirps and transmitting a second subsequence of successive chirps,
wherein the reception channel is configured to generate a digital radar signal having a sequence of signal segments from chirp echoes corresponding to the sequence of RF chirps, wherein each signal segment of the sequence of signal segments is respectively associated with a different chirp of the sequence of RF chirps; and
at least one processor configured to:
generate a range-Doppler map based only on a first subsequence of successive signal segments of the sequence of signal segments, wherein the first subsequence of successive signal segments are associated with the first subsequence of successive chirps;
detect radar targets in the range-Doppler map, including determining a distance value and a velocity value for each detected radar target from the range-Doppler map;
ascertain whether the detected radar targets comprise a group of radar targets having overlapping signal components in a distance dimension of the range-Doppler map; and
in response to detecting the group of radar targets having the overlapping signal components, calculate a spectral value for each radar target of the group of radar targets having the overlapping signal components based on a second subsequence of successive signal segments of the sequence of signal segments and based on velocity values, ascertained from the range-Doppler map, that correspond to the radar targets of the group of radar targets, wherein the second subsequence of successive signal segments are associated with the second subsequence of successive chirps,
wherein the second subsequence of successive chirps has a smaller number of chirps than the first subsequence of successive chirps.

11. The system as recited in claim 10,
wherein, in order to detect the radar targets, the at least one processor is configured to use the digital radar signal as a basis for calculating the range-Doppler map and determine in the range-Doppler map a local maxima pointing to corresponding radar targets, and
wherein, in order to ascertain whether the detected radar targets comprise the group of radar targets having overlapping signal components, the at least one processor is configured to determine whether the detected radar targets have signal components in a same frequency bin of the range-Doppler map, wherein the detected radar targets that have the signal components in the same frequency bin of the range-Doppler map are grouped into the group of radar targets.

12. The system as recited in claim 10, wherein, in response to detecting the group of radar targets having the overlapping signal components, the at least one processor configured to:
generate a range map based on the second subsequence of successive signal segments of the sequence of signal segments,
extract values of at least one distance frequency bin from the range map, wherein the at least one distance frequency bin corresponds to at least one distance frequency bin of the range-Doppler map comprising the overlapping signal components, and
calculate the spectral value for each radar target of the group of radar targets having the overlapping signal components by determining each spectral value based on the extracted values and the velocity values, obtained from the range-Doppler map, that correspond to the radar targets of the group of radar targets.

13. The system as recited in claim 10, wherein, in response to detecting the group of radar targets having the overlapping signal components, the at least one processor configured to:
generate a range map based on the second subsequence of successive signal segments of the sequence of signal segments, and
calculate the spectral value for each radar target of the group of radar targets having the overlapping signal components based on values extracted from the range map and based on the velocity values, obtained from the range-Doppler map, that correspond to the radar targets of the group of radar targets.

14. The system as recited in claim 13, wherein the values extracted from the range map are separated from each other.

15. The system as recited in claim 10, wherein:
the group of radar targets have the overlapping signal components in a same distance frequency bin of the range-Doppler map and have no overlapping signal components in velocity frequency bins of the range-Doppler map, or
the group of radar targets have the overlapping signal components in adjacent distance frequency bins of the range-Doppler map and have no overlapping signal components in the velocity frequency bins of the range-Doppler map.

16. The system as recited in claim 10, wherein the distance value and the velocity value for each detected radar target are extracted from the range-Doppler map.

17. The system as recited in claim 10, wherein the calculation of the spectral value for each radar target of the group of radar targets having the overlapping signal components comprises:
transforming the second subsequence of successive signal segments into a frequency domain in order to obtain a corresponding spectra;
extracting values from a frequency bin of the obtained corresponding spectra that is associated with the group of radar targets; and
estimating a spectral value for each radar target of the group of radar targets based on the extracted values.

18. The system as recited in claim 10, wherein the first subsequence of successive signal segments is associated with the first subsequence of successive chirps emitted via the first transmission channel, and wherein the second subsequence of successive signal segments is associated with the first subsequence of successive chirps emitted via the second transmission channel.

19. A method, comprising:
transmitting a first subsequence of temporally successive chirps via a first channel of a radar system;
transmitting a second subsequence of temporally successive chirps via a second channel of the radar system, wherein the second subsequence of temporally successive chirps is either transmitted after the first subsequence of temporally successive chirps in time or transmitted before the first subsequence of temporally successive chirps in time, and wherein the second subsequence of temporally successive chirps has a smaller number of chirps than the first subsequence of temporally successive chirps;
generating a range-Doppler map based only on the first subsequence of temporally successive chirps;
detecting one or more radar targets in the range-Doppler map;
determining a distance value and a velocity value for each detected radar target based on the range-Doppler map;
generating a range map based only on the second subsequence of temporally successive chirps; and
calculating an angle for each detected radar target based on signal components extracted from the range map and velocity values determined from the range-Doppler map.

20. The method as recited in claim 19, wherein the radar system is a multiple input multiple output (MIMO) radar system, and the first channel and the second channel are virtual channels of the MIMO radar system.

21. A system, comprising:
a radar transceiver configured to transmit a first subsequence of temporally successive chirps via a first channel of a radar system and to transmit a second subsequence of temporally successive chirps via a second channel, wherein the second subsequence of temporally successive chirps is either transmitted after the first subsequence of temporally successive chirps in time or transmitted before the first subsequence of temporally successive chirps in time, and wherein the second subsequence of temporally successive chirps has a smaller number of chirps than the first subsequence of temporally successive chirps; and
at least one processor configured to:
generate a range-Doppler map based only on the first subsequence of temporally successive chirps,
detect one or more radar targets in the range-Doppler map,
determine a distance value and a velocity value for each detected radar target based on the range-Doppler map,
generate a range map based only on the second subsequence of temporally successive chirps, and
determine an angle for each the detected radar target based on the signal components extracted from the range map and velocity values determined from the range-Doppler map.

* * * * *

UNITED STATES PATENT AND TRADEMARK OFFICE
CERTIFICATE OF CORRECTION

PATENT NO. : 11,693,106 B2
APPLICATION NO. : 16/675574
DATED : July 4, 2023
INVENTOR(S) : Oliver Lang et al.

Page 1 of 1

It is certified that error appears in the above-identified patent and that said Letters Patent is hereby corrected as shown below:

In the Claims

Column 22, Line 27, change "based on the signal components extracted from the" to --based on signal components extracted from the--

Signed and Sealed this
Thirtieth Day of September, 2025

John A. Squires
*Director of the United States Patent and Trademark Office*